United States Patent
Betz

(10) Patent No.: US 12,194,953 B2
(45) Date of Patent: Jan. 14, 2025

(54) SEAT BELT SYSTEM FOR A VEHICLE AND VEHICLE WITH A SEAT BELT SYSTEM

(71) Applicant: ZF AUTOMOTIVE GERMANY GMBH, Alfdorf (DE)

(72) Inventor: Hans-Peter Betz, Böbingen (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 260 days.

(21) Appl. No.: 17/774,520

(22) PCT Filed: Nov. 3, 2020

(86) PCT No.: PCT/EP2020/080758
§ 371 (c)(1),
(2) Date: May 5, 2022

(87) PCT Pub. No.: WO2021/089512
PCT Pub. Date: May 14, 2021

(65) Prior Publication Data
US 2022/0388475 A1    Dec. 8, 2022

(30) Foreign Application Priority Data

Nov. 7, 2019 (DE) .................. 10 2019 129 993.4

(51) Int. Cl.
*B60R 22/26* (2006.01)
*B60R 22/18* (2006.01)
*B60R 22/195* (2006.01)

(52) U.S. Cl.
CPC .......... *B60R 22/26* (2013.01); *B60R 22/1951* (2013.01); *B60R 2022/1818* (2013.01)

(58) Field of Classification Search
CPC ............ B60R 22/26; B60R 22/1951; B60R 2022/1818
See application file for complete search history.

(56) References Cited

U.S. PATENT DOCUMENTS 4,363,501 A * 12/1982 Takada .................... B60R 22/04
297/469
4,767,161 A *  8/1988 Sedlmayr ............ B60R 22/1951
297/472

(Continued)

FOREIGN PATENT DOCUMENTS

| DE | 20200741 U1 | 5/2002 |
| DE | 10112853 A1 | 10/2002 |
| EP | 1329367 A1 | 7/2003 |

OTHER PUBLICATIONS

PCT International Search Report for corresponding International Application Serial No. PCT/EP2020/080758, mailed Dec. 14, 2020, pp. 1-5.

*Primary Examiner* — David R Dunn
*Assistant Examiner* — Christopher E Veraa
(74) *Attorney, Agent, or Firm* — Tarolli, Sundheim, Covell & Tummino LLP

(57) ABSTRACT

A seat belt system for a vehicle comprising a seat (16) that includes a seat frame (26) with a seat frame side part (28), a seat belt (18) associated with the seat (16) and having a webbing (40), and a belt tensioner associated with the seat belt (18). The seat frame side part (28) includes a lateral opening (36) facing the vehicle interior. The seat (16) includes a seat cross tube that opens into the vehicle interior via the opening (36). The belt tensioner is accommodated in the seat cross tube. The seat belt system further includes a belt guide (54) and a webbing deflector (56) for the webbing (40), the belt guide (54) being provided at the opening (36). Moreover, a vehicle comprising such a seat belt system is provided.

16 Claims, 5 Drawing Sheets

(56) References Cited

U.S. PATENT DOCUMENTS

| | | | | |
|---|---|---|---|---|
| 5,022,677 A * | 6/1991 | Barbiero | B60R 22/06 | 297/483 |
| 5,129,679 A * | 7/1992 | Specht | A44B 11/2507 | 297/480 |
| 5,374,110 A * | 12/1994 | Hiramatsu | B60R 22/1953 | 297/480 |
| 5,452,941 A * | 9/1995 | Halse | B60N 2/688 | 297/483 |
| 5,544,917 A * | 8/1996 | Loxton | B60R 22/26 | 280/808 |
| 5,636,901 A * | 6/1997 | Grilliot | B60N 2/68 | 248/188.1 |
| 5,984,419 A * | 11/1999 | Partington | B60N 2/70 | 297/483 |
| 6,382,674 B1 * | 5/2002 | Specht | B60R 22/1951 | 297/480 |
| 6,520,588 B1 * | 2/2003 | Busch | B60R 22/26 | 297/483 |
| 6,712,394 B2 * | 3/2004 | Betz | B60R 22/1952 | 297/480 |
| 7,469,928 B2 * | 12/2008 | Clute | B60R 22/46 | 297/479 |
| 7,823,924 B2 * | 11/2010 | Dewey | B60R 22/24 | 297/480 |
| 2003/0155801 A1 | 8/2003 | Tatematsu et al. | | |
| 2003/0164610 A1 | 9/2003 | Edrich et al. | | |
| 2003/0230872 A1 * | 12/2003 | Sakai | B60N 2/42718 | 280/728.1 |
| 2006/0261625 A1 * | 11/2006 | Kroner | B60N 2/161 | 296/68.1 |
| 2009/0146487 A1 * | 6/2009 | Becker | B60N 2/688 | 297/483 |
| 2011/0012418 A1 * | 1/2011 | Mages | B60R 22/1951 | 297/480 |
| 2013/0278042 A1 * | 10/2013 | Wenz | B60N 2/688 | 297/463.1 |
| 2016/0375859 A1 * | 12/2016 | Feng | B60R 22/1954 | 242/374 |
| 2018/0281746 A1 * | 10/2018 | Lee | B60R 22/24 | |

* cited by examiner

SEAT BELT SYSTEM FOR A VEHICLE AND VEHICLE WITH A SEAT BELT SYSTEM

RELATED APPLICATIONS

This application is a U.S. National Stage Application filed under 35 USC 371 claiming priority to Serial No. PCT/EP2020/080758, filed on 3 Nov. 2020; which claims priority from German Patent Application DE 10 2019 129 993.4, filed 7 Nov. 2019, the entireties of which are hereby incorporated herein by reference.

TECHNICAL FIELD

The invention relates to a seat belt system for a vehicle comprising a seat including a seat frame with a seat frame lateral part, a seat belt associated with the seat and having a webbing, and a belt tensioner associated with the seat belt. Further, the invention relates to a vehicle comprising such a seat belt system.

BACKGROUND

Seat belt systems for vehicles comprising a belt tensioner are known.

Belt tensioners are used to eliminate a belt slack of the seat belt. Linear belt tensioners act on an end fitting or a belt buckle, for example, and apply a retraction force to the latter. Such belt tensioner includes a cylinder in which a linearly movable piston including a tension transmitter is arranged. In the case of activation, for example in the event of strong impact, a pressurized fluid is applied to the piston by a gas generator, for example, and causes the piston to move in a tensioning direction.

Belt tensioners of this type are usually disposed on the side of the seat where they require useful space and limit the design. Alternatively, such belt tensioner may be arranged beneath the seat. In this case, the connection of the webbing to the belt tensioner limits the flexibility of the seat belt, however, thus reducing the comfort for the vehicle occupant protected by the seat belt.

In a buckle tensioner, the connection between the belt buckle and the belt tensioner is usually made via a steel rope enabling a certain flexibility of the connection. In the case of end fitting tensioners, the connection between the belt tensioner and the webbing is usually made via a connecting or coupling member.

SUMMARY

It is the object of the invention to provide a seat belt system that is both designed compactly and offers high comfort and that dispenses with any connecting members between the webbing and the associated belt tensioner visible to the vehicle occupant.

For achieving the object, a seat belt system for a vehicle is provided comprising a seat including a seat frame with a seat frame side part, a seat belt associated with the seat and including a webbing, and a belt tensioner associated with the seat belt. The seat frame side part has a lateral opening facing the vehicle interior. The seat has a seat cross tube that opens into the vehicle interior via the opening. The belt tensioner is accommodated in the seat cross tube. The seat belt system further includes a belt guide and a webbing deflector for the webbing. The belt guide is provided at the opening.

The belt tensioner is particularly configured as end fitting tensioner.

The term "vehicle interior" denotes the space directly surrounding the seat which, in a closed vehicle, forms the vehicle interior for the vehicle occupants. The seat belt system according to the invention is not limited to closed vehicles, however, and can equally be provided for an at least partly open vehicle. In this case, the vehicle interior relates to the space adjacent to the seat.

By being accommodated in the seat cross tube which is part of the seat, the belt tensioner is arranged inside the seat and requires no additional space outside the seat. Hence, the seat belt system can have a particularly compact design.

At the same time, it can be safeguarded by means of the belt guide and the webbing deflector that the webbing is guided in the direction of the vehicle occupant so that it provides a particularly proper protective effect in the case of restraint and extends in a manner particularly convenient to the vehicle occupant. The webbing is advantageously guided into the interior of the seat cross tube such that the vehicle occupant will not recognize any visible connecting or coupling members between the webbing and the belt tensioner.

The belt tensioner may include a fastener to which one end of the webbing is fastened. This can safeguard the webbing to be reliably attached to the belt tensioner.

In one embodiment, the belt guide is arranged between the webbing deflector and the fastener so that the webbing extends from the fastener via the belt guide to the webbing deflector. In this way, the webbing can be guided by the belt tensioner through the opening to the vehicle occupant so that, in the case of restraint, the webbing and/or the seat belt is/are safely tensioned using the belt tensioner, in particular without the webbing getting stuck or jammed.

In another embodiment, the fastener is accommodated in a home position of the belt tensioner and in a restraint position of the belt tensioner in the seat cross tube. The home position in this case designates a position at which the belt tensioner was not activated and is ready for being activated. The restraint position designates a position adopted by the belt tensioner after being activated to tension the webbing and, resp., the seat belt.

In particular, in the home position and in the restraint position the belt tensioner is completely accommodated in the seat cross tube, thus allowing the seat belt system to have a particularly compact design.

The belt guide may be provided to include a guide portion in the form of a ring or a ring portion. This allows to ensure reliable guiding of the webbing at different positions at which the webbing extends to different radial directions away from the opening in the direction of the vehicle occupant.

In particular, the guiding portion may take an annular shape, thereby the guide being equal in all radial directions.

According to one embodiment, the webbing deflector is pivotally attached to the seat. In this way, the connection of the seat belt via the webbing to the belt tensioner is configured to be flexible so that the webbing extension can be adapted from the vehicle occupant to a position convenient to the latter.

It is of advantage when the webbing deflector has a guide opening through which the webbing extends. Accordingly, the webbing is safely guided by the webbing deflector at all positions of the seat belt. Furthermore, the webbing cannot slip laterally out of the webbing deflector so that the seat belt system is constantly ensured to provide a defined and high protective effect in the case of restraint.

According to another embodiment, the webbing deflector is attached to the seat frame side part, thus allowing the webbing deflector to be provided in a particularly stable manner and requiring little space.

The seat cross tube may be an integral part of the seat frame, thereby allowing the belt tensioner to be fastened within the seat in a particularly positionally stable manner.

In accordance with the invention, for achieving the aforementioned object also a vehicle comprising a seat belt system according to the invention offering the afore-listed advantages is provided.

BRIEF DESCRIPTION OF THE DRAWINGS

Further advantages and features will be evident from the following description and from the attached drawings, wherein.

DESCRIPTION

Figure 1:
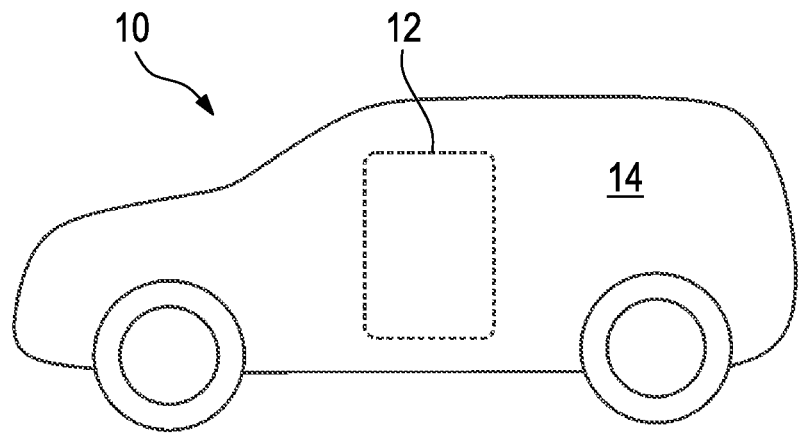
FIG. 1 shows a schematic representation of a vehicle according to the invention comprising a seat belt system according to the invention.

FIG. 1 illustrates a vehicle 10 comprising a seat belt system 12 that is provided in the vehicle interior 14 of the vehicle 10.

The vehicle 10 may be any vehicle for passenger transport such as a car, a truck or a coach.

Figure 2:
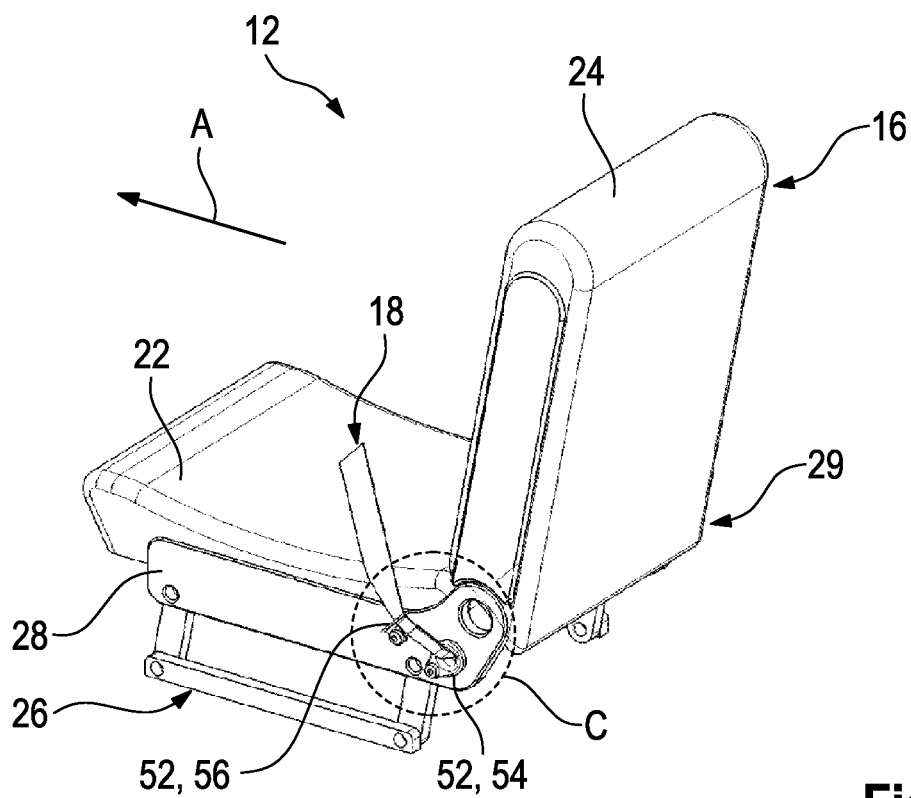
FIG. 2 shows a perspective view of the seat belt system from FIG. 1 according to a first embodiment.
Figure 4:
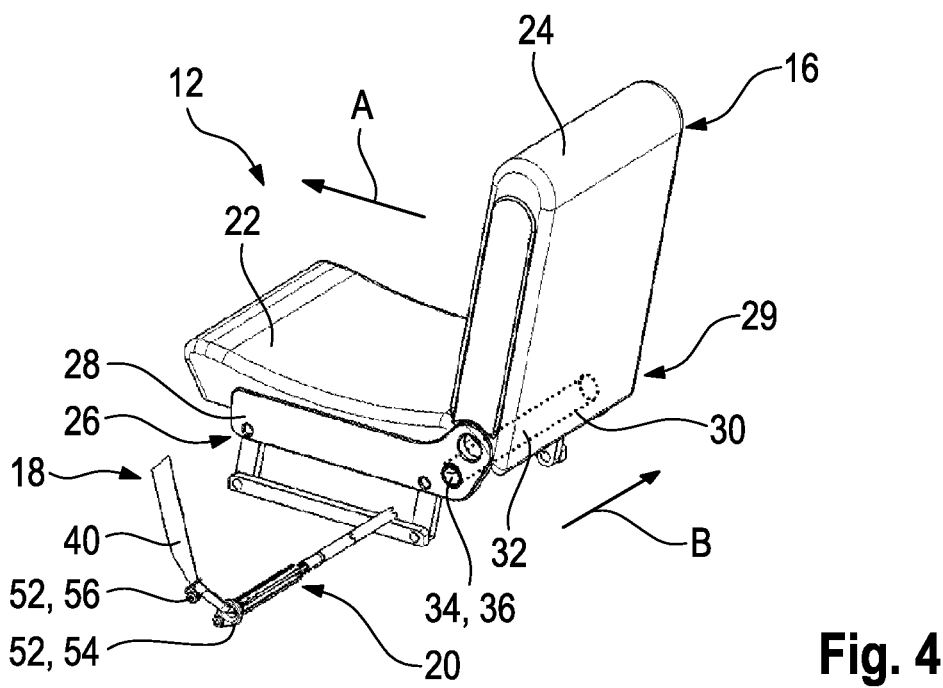
FIG. 4 shows an exploded view of the seat belt system from FIG. 2.

The seat belt system 12 has a seat 16 (see FIG. 2), a seat belt 18 and a belt tensioner 20 (see FIG. 4).

The seat 16 includes a seating area 22 and a seat back 24 which together define a sitting direction A corresponding to the orientation of a vehicle occupant seated in the seat 16 and, resp., to the viewing direction of the vehicle occupant when he/she looks straight ahead.

Moreover, the seat 16 has a seat frame 26 by means of which the seating area 22 and the seat back 24 are fastened to the bottom in the vehicle interior 14.

The seat frame 26 comprises two seat frame side parts 28, 29 disposed on opposite sides of the seat 16, and a seat cross tube 30 connecting the two seat frame side parts 28, 29 to each other.

The seat cross tube 30 extends in the direction B through the seat 16, with the direction B being transverse to the sitting direction A.

In the present embodiment, the direction B extends horizontally as well as perpendicularly to the sitting direction A.

As a matter of course, the seat cross tube 30 may extend, in an alternative embodiment, in any direction through the seat 16.

The seat cross tube 30 has a hollow cylindrical design with a circular cross-section, the cavity inside the seat cross tube 30 forming a mount 32 for the belt tensioner 20.

Basically, the seat cross tube 30 may have any design as long as it includes a mount 32 for the belt tensioner 20.

The seat frame side part 28 has a passage 34 extending in the direction B through the seat frame side part 28 and opens into the outer face 38 of the seat frame side part 28 facing the vehicle interior 14 via an opening 36.

The seat cross tube 30 is connected to the seat frame side part 28 so that the seat cross tube 30 opens into the vehicle interior 14 via the passage 34 and the opening 36 forms an access to the mount 32.

The seat frame 26 is made from steel, with the seat frame side parts 28, 29 being welded to the seat cross tube 30.

In an alternative embodiment, each of the seat frame side parts 28, 29 and/or the seat cross tube 30 can be made from any, preferably high-strength, material.

In addition, or alternatively, the seat frame side parts 28, 29 may be connected, particularly integrally, to the seat cross tube 30 in any way.

As a matter of course, the seat cross tube 30 optionally may be a separate component which is not part of the seat frame 26 and/or is not integrally connected to the seat frame side part 28.

In an alternative embodiment, the seat 16 may have any design as long as it includes at least one seat frame side part 28, 29 and one seat cross tube 30 whose mount 32 is connected to the vehicle interior 14 via the seat frame side part 28, 29 and opens into the vehicle interior 14, respectively.

Figure 5:
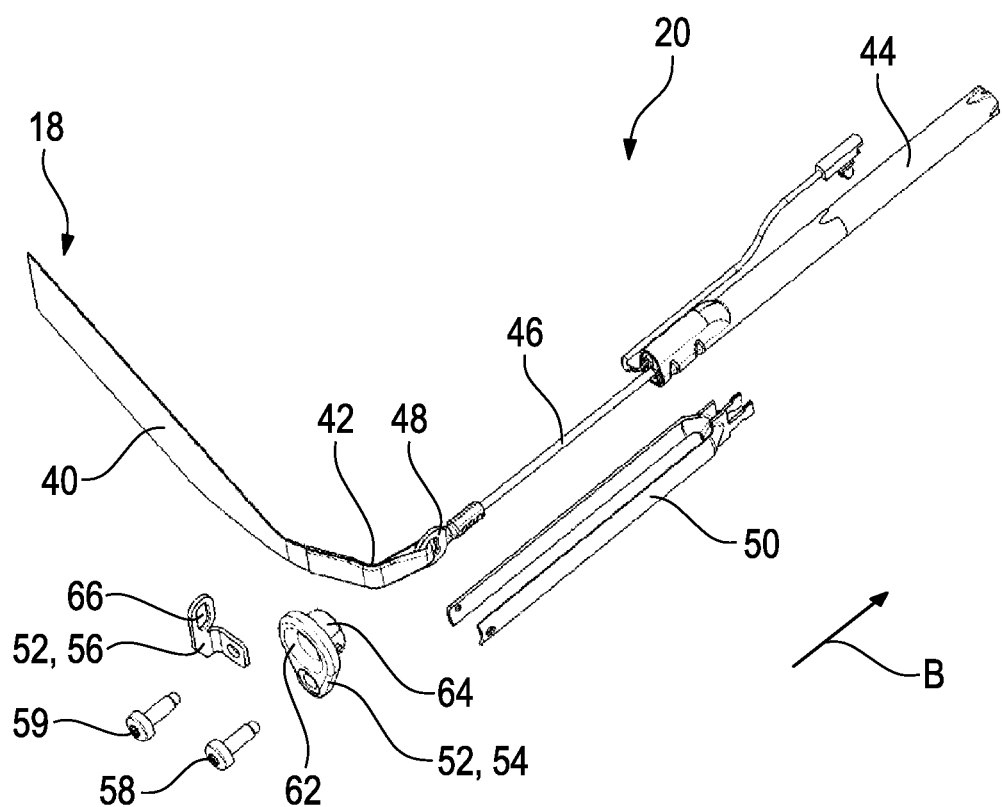
FIG. 5 shows an exploded view of a belt tensioner and webbing guide means of the seat belt system from FIG. 2.

The seat belt 18, only a portion of which is shown in the Figures, comprises a webbing 40 with an end 42 (see FIG. 5).

In one embodiment, the seat belt 18 is a three-point seat belt.

The end 42 is formed by a webbing loop of the webbing 40.

Basically, the end 42 of the webbing 40 may have any design.

The belt tensioner 20 has a tensioning unit 44 and a tension transmitter 46 including a fastener 48 for the webbing 40.

The fastener 48 is a fitting in the form of a webbing eyelet through which the webbing loop extends, thereby the end 42 of the webbing 40 being fastened to the tension transmitter 46.

Basically, the fastener 48 may have any design and the end 42 of the webbing 40 may be fastened to the tension transmitter 46 in any way.

The tension transmitter 46 in this case is a steel cable.

As a matter of course, in an alternative embodiment the tension transmitter 46 may have any design such as a rod or a cable.

The belt tensioner 20 is arranged to pull the end 42 of the webbing 40, in the case of restraint such as during a collision, in the direction B to tension the webbing 40 and, thus, the seat belt 18.

For this purpose, the belt tensioner 20 has a home position shown in FIG. 5, as well as a restraint position at which the fastener 48 is adjusted in the direction B vis-à-vis the home position via the tension transmitter 46 by means of the tensioning unit 44.

The energy required to tension the webbing 40 is provided by a drive of the tensioning unit 44, for example in the form of a pyrotechnical gas generator.

The belt tensioner 20 is a linear end fitting tensioner in the present embodiment.

In an alternative embodiment, the belt tensioner 20 may be any belt tensioner.

The belt tensioner 20 is disposed in the mount 32 and is fastened in the seat cross tube 30 by means of a mounting fitting 50.

Basically, the belt tensioner 20 may be fastened in any way within the seat cross tube 30.

Accordingly, the seat belt system 12 is configured such that the belt tensioner 20 is completely accommodated in the mount 32 both in the home position and in the restraint position.

In particular, the fastener 48 is disposed in the home position in the direction B ahead of the opening 36 so that the webbing 40 extends from the fastener 48 through the opening 36 into the vehicle interior 14.

Figure 3:
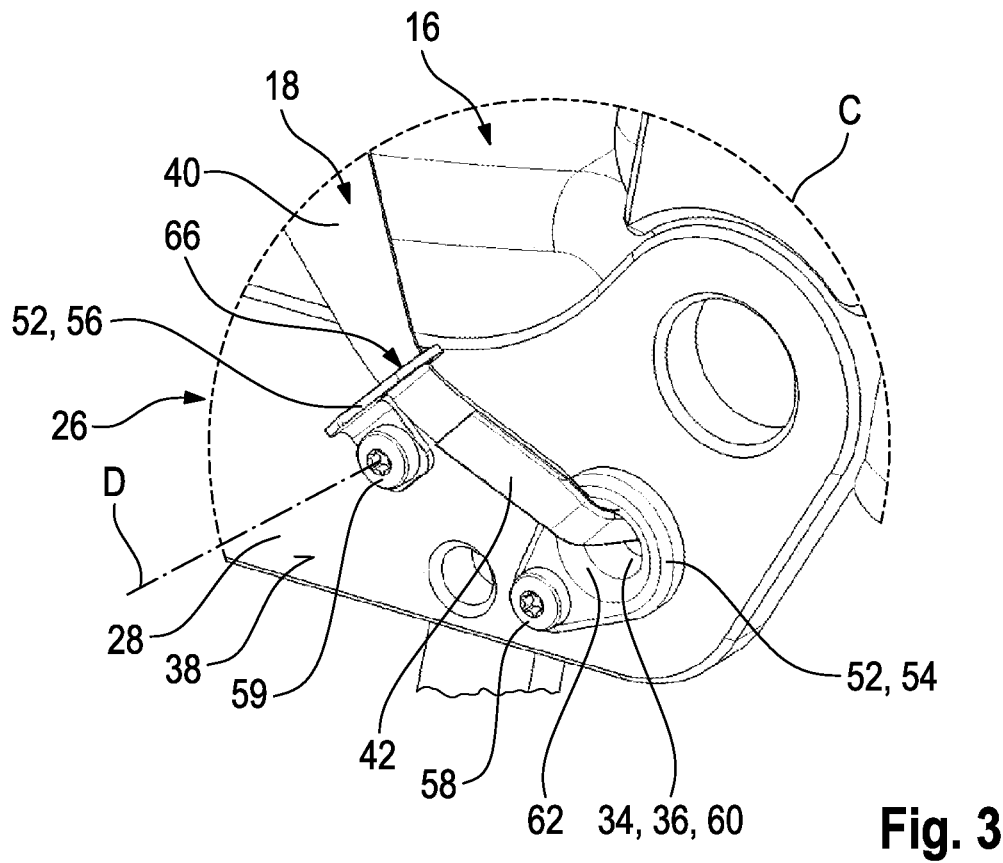
FIG. 3 shows a detail view of the cutout C of the seat belt system from FIG. 2.

For ensuring reliable and comfortable extension of the seat belt 18, the seat belt system 12 has two webbing guide means 52 in the form of a belt guide 54 and a webbing deflector 56, which will be illustrated in the following based on FIG. 3.

The webbing guide means 52 are one-piece fittings made from steel and thus are particularly robust.

Basically, the belt guide 54 and/or the webbing deflector 56 may have any design, in particular may be made from any material.

Each of the belt guide 54 and the webbing deflector 56 is attached to the outer face 38 of the seat frame side part 28 using a screw 58, 59 and, in this way, are fastened particularly simply and reliably to the seat frame side part 28.

As a matter of course, the belt guide 54 and/or the webbing deflector 56 can be fastened in any way in an alternative embodiment.

The belt guide 54 is provided at the opening 36 and has a circular guide passage 60 extending in the direction B through the belt guide 54.

At the position where the guide passage 60 opens into the vehicle interior 14, the belt guide 54 includes a guide portion 62 which circularly surrounds the opening and is provided as a contact face for the webbing 40.

In this case, the guide portion 62 is formed by a chamfer at the end of the guide passage 60 facing the vehicle interior 14.

In an alternative embodiment, the guide portion 62 may have any design such as a fillet.

Furthermore, the guide portion 62 need not extend completely, but only in portions, around the opening so that the guide portion 62 takes the shape of a ring portion instead of a closed ring.

In this case, the guide portion 62 is preferably interposed between the opening 36 and the webbing deflector 56 so that the webbing 40 contacts the guide portion 62, when it extends from the belt tensioner 20 to the vehicle occupant.

Opposite to the guide portion 62, the belt guide 54 includes a sleeve-type connection piece 64 (see FIG. 5) extending into the passage 34. In connection with the screw 58, the belt guide 54 is thus arranged in a rotationally fixed manner on the seat frame side part 28.

In an alternative embodiment, the connection piece 64 may have any design.

Further, the belt guide 54 may be configured without a connection piece 64.

Basically, the belt guide 54 may have any design, in particular the guide passage 60.

The webbing deflector 56 is provided on the vehicle occupant side from the belt guide 54. That is, the webbing 40 extends from the vehicle occupant via the webbing deflector 56 through the belt guide 54 to the belt tensioner 20.

In the present embodiment, no further webbing guide means 52 are provided between the webbing deflector 56 and the vehicle occupant.

As a matter of course, in an alternative embodiment further webbing guide means 52 may be provided, in particular ahead of and/or behind the webbing deflector 56, as illustrated in the embodiments of FIGS. 6 to 9.

The webbing deflector 56 includes a guide opening 66 (see FIG. 5) through which the webbing 40 extends from the vehicle occupant to the belt guide 54.

The guide opening 66 is ring-shaped and thus circumferentially closed.

As an alternative, the guide opening 66 may be circumferentially opened, for example in the form of a lateral recess in the webbing deflector 56.

The guide opening 66 is arranged on the seat frame side part 28 to be pivoting about the axis of rotation D vis-à-vis the seat frame side part 28, thus allowing the orientation of the webbing deflector 56 and, consequently, the orientation of the guide opening 66 to adapt to different webbing extensions of the seat belt 18.

The guide portion 62 and the guide opening 66 are preferably configured so that they guide the webbing 40 with low friction to minimize wear of the webbing 40 and to ensure high functional safety of the seat belt system 12.

Figure 6:
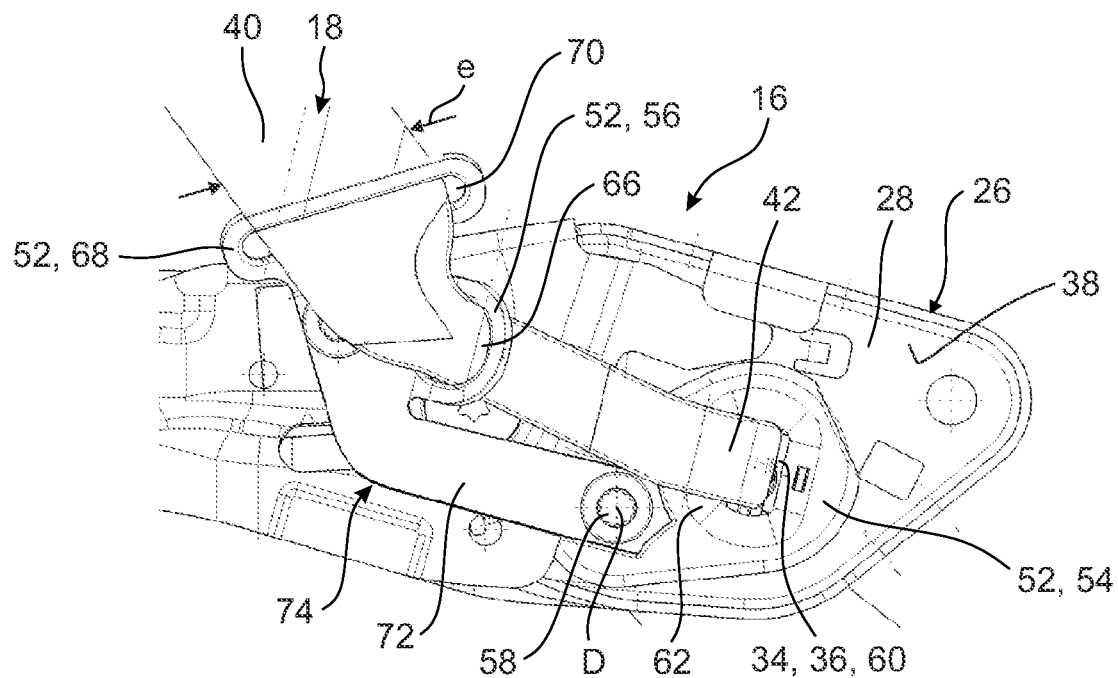
FIG. 6 shows a detail view of the seat belt system from FIG. 1 according to another embodiment including a holder.
Figure 7:
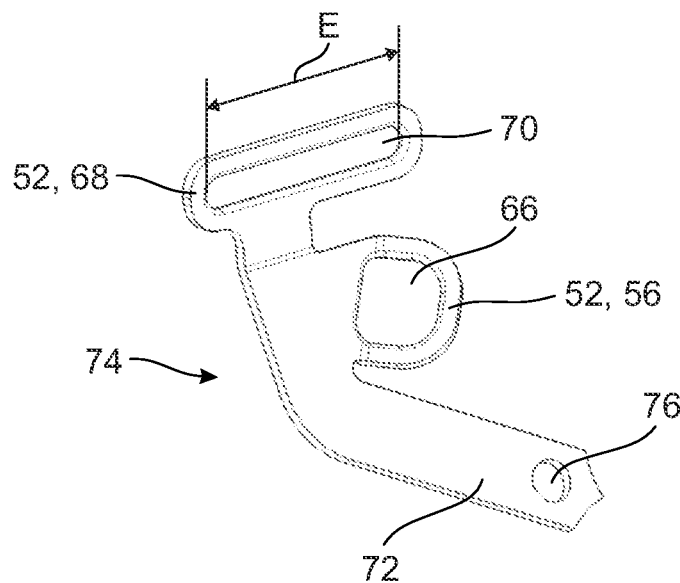
FIG. 7 shows a lateral view of the holder from FIG. 6.

Based on FIGS. 6 and 7, a seat belt system 12 according to another embodiment shall be described. For the components that are known from the above embodiment, the same reference numerals are used and, insofar, the preceding explanations are referred to.

In this embodiment, the seat belt system 12 includes another webbing guide means 52 in the form of a second belt guide 68 that is provided on the vehicle occupant side from the webbing deflector 56. That is, the webbing 40 extends from the vehicle occupant via the second belt guide 68 to the webbing deflector 56 and from there through the belt guide 54 to the belt tensioner 20.

Moreover, in contrast to the embodiment illustrated in FIGS. 2 to 5, the guide passage 60 is not circular but merely ring-shaped, which may also be different, of course.

The second belt guide 68 has an elongate guide opening 70 (see FIG. 7) through which the webbing 40 extends from the vehicle occupant to the webbing deflector 56.

The elongate guide opening 70 is ring-shaped and, thus, is circumferentially closed.

Alternatively, the elongate guide opening 70 can be circumferentially opened, such as by means of a lateral recess of the second belt guide 68.

The elongate guide opening 70 further has a width E that is larger than the width e of the webbing 40, thus allowing the same to be guided from the second belt guide 68 in full width to the vehicle occupant.

Analogously to the guide portion 62 and to the guide opening 66, also the elongate guide opening 70 is preferably configured to guide the webbing 40 with low friction so as to minimize wear of the webbing 40 and to ensure high functional safety of the seat belt system 12.

The second belt guide 68 and the webbing deflector 56 are connected to each other via a support 72 and jointly form a holder 74 of the seat belt system 12.

In the shown embodiment, the holder 74 is formed in one piece, for example as a cut and bent part, thus making it particularly inexpensive and compact.

The holder 74 includes a mounting opening 76 disposed at an end of the support 72 opposed to the second belt guide 68.

The holder 74 is attached, via the mounting opening 76, to the seat frame side part 28 to be pivoting about the axis of rotation vis-à-vis the seat frame side part 28. In this way, the orientation of the webbing deflector 56 and of the second belt guide 68 and, thus, the orientation of the guide opening 66 and the elongate guide opening 70 can adapt to different webbing extensions of the seat belt 18.

In the shown embodiment, the holder 74 is fastened to the seat frame side part 28 together with the belt guide 54 via the screw 58, thus allowing the seat belt system 12 to have a particularly compact and low-mass design.

Basically, the holder 74 may be arranged at any position and in any way on the seat frame side part 28, particularly by a separate fastener.

Accordingly, the guide opening 66 is arranged vis-à-vis the vehicle occupant beneath the elongate guide opening 70 such that the webbing deflector 56 guides the webbing 40 toward the opening 36 and, in the case of restraint, absorbs load from the webbing 40.

As a matter of course, in an alternative embodiment, the holder 74 may be arranged rigidly, i.e., not pivotally, on the seat frame side part 28.

Figure 8:
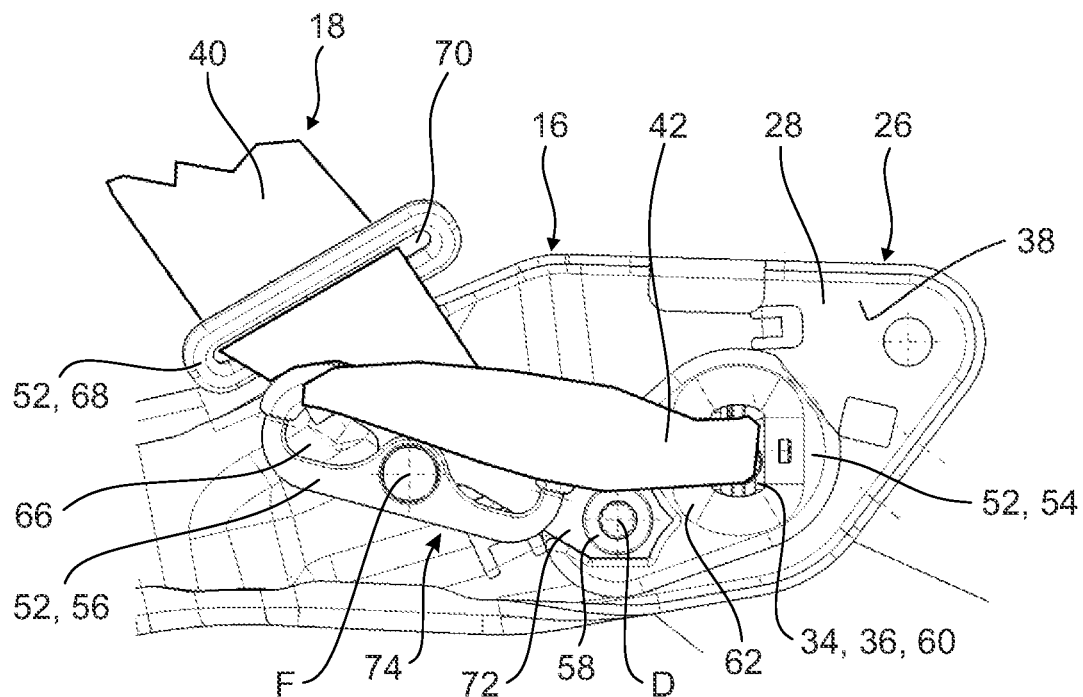
FIG. 8 shows a detail view of the seat belt system from FIG. 1 according to another embodiment comprising a holder.
Figure 9:
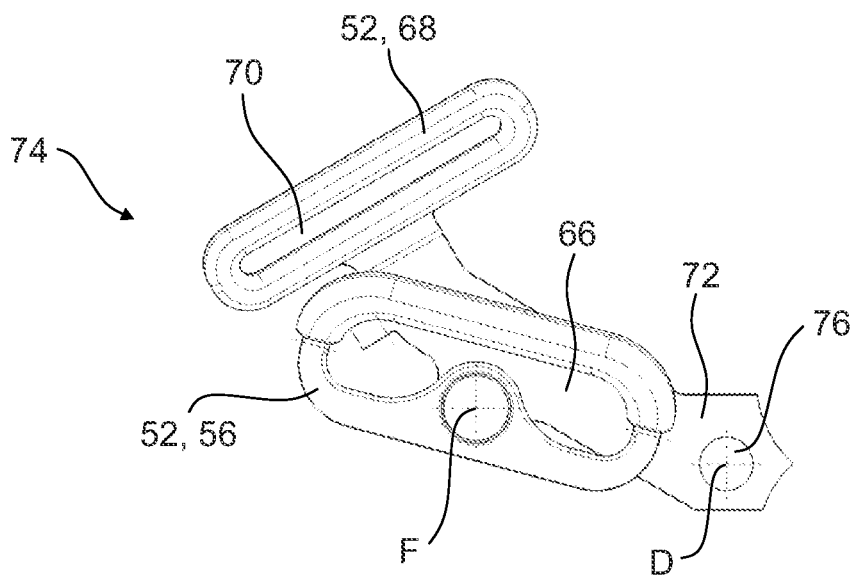
FIG. 9 shows a lateral view of the holder from FIG. 8.

Based on FIGS. 8 and 9, a seat belt system 12 according to another embodiment shall be described. For the components that are known from the foregoing embodiments the same reference numerals are used and, insofar, the preceding explanations are referred to.

In contrast to the embodiment shown in FIGS. 6 and 7, the webbing deflector 56 is arranged on the support 72 to be pivoting about the axis of rotation F vis-à-vis the support 72.

For this purpose, the webbing deflector 56 may be pivotally fastened on the support 72 by a fastener such as a screw 58, 59 or a rivet.

As the holder 74 is arranged pivotally about the axis of rotation D and, additionally, the webbing deflector 56 is arranged pivotally about the axis of rotation F vis-à-vis the seat frame side part 28, the orientation of the webbing deflector 56 and the orientation of the second belt guide 68 and, thus, the orientation of the guide opening 66 as well as the orientation of the elongate guide opening 70 can adapt independently of each other to different webbing extensions of the seat belt 18, thus ensuring a particularly inexpensive and effective belt guide.

In an alternative embodiment in which the holder 74 is rigidly attached to the seat frame side part 28, the pivoting webbing deflector 56 ensures the orientation of the webbing deflector 56 and, thus, the orientation of the guide opening 66 to nevertheless adapt to different webbing extensions of the seat belt 18.

In all embodiments, a seat belt system 12 that does not require any space on the side of the seat 16 for the belt tensioner 20 is provided in this way.

The tensioning unit 44 and, consequently, the drive of the belt tensioner 20 are installed completely within the seat cross tube 30 so that hot gas or particles from the drive of the belt tensioner 20, in particular in the case of a pyrotechnical drive, is/are reliably prevented from getting into contact with combustible or heat-sensitive materials.

The tensioning unit 44 is not visible for a vehicle occupant even without any additional cover. Merely the webbing 40 and the webbing guide means 52 are visible, analogously to applications without a belt tensioner 20.

The required webbing extension toward the vehicle occupant can be adjusted as required by flexible positioning of the webbing deflector 56 and/or the second belt guide 68 so as to avoid submarining and to increase the comfort for the vehicle occupant.

The seat belt system 12 may further include a cover (not shown) for covering the webbing guide means 52 from the vehicle interior 14 to meet requirements in terms of function, safety and/or design.

The invention is not limited to the shown embodiment. In particular, individual features of one embodiment can be freely combined with any features of other embodiments, in particular independently of the other features of the respective embodiments.

The invention claimed is:

1. A seat belt system for a vehicle (10) comprising a seat (16) that includes a seat frame (26) with a seat frame side part (28, 29), a seat belt (18) associated with the seat (16) and having a webbing (40), and a belt tensioner (20) associated with the seat belt (18), the seat frame side part (28, 29) having a lateral opening (36) facing the vehicle interior (14),
wherein
the seat (16) includes a seat cross tube (30) that opens into the vehicle interior (14) via the opening (36), wherein the belt tensioner (20) is accommodated in the seat cross tube (30),
wherein the seat belt system (12) includes a belt guide (54) and a webbing deflector (56) for the webbing (40), wherein the belt guide (54) is provided at the opening (36).

2. The seat belt system according to claim 1, wherein the belt tensioner (20) is an end fitting tensioner.

3. The seat belt system according to claim 1, wherein the belt tensioner (20) includes a fastener (48) to which one end (42) of the webbing (40) is fastened.

4. The seat belt system according to claim 3, wherein the belt guide (54) is interposed between the webbing deflector (56) and the fastener (48).

5. The seat belt system according to claim 3, wherein the fastener (48) is accommodated within the seat cross tube (30) in a home position of the belt tensioner (20) and in a restraint position of the belt tensioner (20).

6. The seat belt system according to claim 1, wherein the belt guide (54) includes a guide portion (62) in the form of a ring or of a ring portion.

7. The seat belt system according to claim 1, wherein the webbing deflector (56) is arranged to be pivoting on the seat (16).

8. The seat belt system according to claim 1, wherein the webbing deflector (56) includes a guide opening (66) through which the webbing (40) extends.

9. The seat belt system according to claim 1, wherein the webbing deflector (56) is arranged on the seat frame side part (28, 29).

10. The seat belt system according to claim 1, wherein the seat cross tube (30) is an integral part of the seat frame (26).

11. A vehicle comprising a seat belt system (12) according to claim 1.

12. A seat belt system according to claim 1, wherein the seat cross tube has an opening that is aligned with the opening in the seat side part.

13. The seat belt system according to claim 12, wherein the belt guide includes a connection piece that extends into the opening in the seat cross tube.

14. A seat belt system according to claim 1, wherein the belt guide and the webbing deflector are connected to the seat frame side part and are spaced from each other.

15. A seat belt system according to claim 1, wherein the belt tensioner is configured to pull the webbing in response to a vehicle collision to tension the webbing and seat belt.

16. A seat belt system according to claim 15, wherein the belt tensioner includes a pyrotechnical gas generator.

* * * * *